United States Patent [19]

Moore

[11] Patent Number: 4,927,579
[45] Date of Patent: May 22, 1990

[54] METHOD FOR MAKING FIBER-REINFORCED PLASTICS

[75] Inventor: Eugene R. Moore, Midland, Mich.

[73] Assignee: The Dow Chemical Company, Midland, Mich.

[21] Appl. No.: 179,346

[22] Filed: Apr. 8, 1988

[51] Int. Cl.$^5$ .............................................. B29C 47/00
[52] U.S. Cl. .................................... 264/101; 264/174; 264/211.21; 264/211.23; 264/328.18; 264/349; 264/DIG. 53
[58] Field of Search ................ 525/935; 524/923, 924; 523/333, 346–353; 264/174, 177.2, 211, 328.18, 101, 87, DIG. 53, 349, DIG. 64, 211.21, 211.23

[56] References Cited

U.S. PATENT DOCUMENTS

| | | | |
|---|---|---|---|
| 3,720,641 | 3/1973 | Berardinelli et al. | 523/333 |
| 3,931,094 | 1/1976 | Segal et al. | 264/328.18 |
| 4,006,209 | 2/1977 | Chiselko et al. | 264/349 |
| 4,015,828 | 4/1977 | Miles | 264/349 |
| 4,288,563 | 9/1981 | Thorpe | 523/333 |
| 4,657,952 | 4/1987 | Kerschbaumer et al. | 523/351 |

FOREIGN PATENT DOCUMENTS

| | | | |
|---|---|---|---|
| 0736551 | 6/1966 | Canada | 523/346 |
| 0888996 | 2/1962 | United Kingdom | 523/351 |

*Primary Examiner*—Hubert C. Lorin
*Attorney, Agent, or Firm*—Price, Heneveld, Cooper, DeWitt & Litton

[57] ABSTRACT

A method for adding intact fiber reinforcing material into thermoplastic resin compositions for toughening purposes without breakage of the fibers, including blending a polymeric solution and chopped fibers in a mixture at low to medium shear, injecting the resulting mixture into an extruder with a resin to be reinforced at an entry point positioned very near a vacuum point, and then removing the solvent for recycle while the reinforcing glass fiber and polymer blend is extruded.

16 Claims, 1 Drawing Sheet

METHOD FOR MAKING FIBER-REINFORCED PLASTICS

BACKGROUND OF THE INVENTION

This invention relates to fiber-reinforced plastic resin compositions. It is well known that the incorporation of reinforcing fibers into polymeric products beneficially affects resin properties such as tensile strength, Izod impact strength, flexural modulus, stiffness, dimensional stability and resistance to creep and thermal expansion.

In reaction spray molding applications, glass roving is chopped and sprayed onto a form with the resin. However, in injection or cast applications, the chopped glass fibers must be blended with the resin prior to injection or casting. Typically, this is done by placing chopped fibers and resin granules in an extrusion hopper or screw plasticating injection hopper together and blending them as the resin is heated. The problem is, the fibers tend to be pulverized in the process, reducing their effectiveness as reinforcement. Some melt the polymer first and then introduce the chopped fibers. This is better, but more expensive. Blending must still be accomplished, and the blending breaks up the fibers.

Typically, reinforcing fibers as supplied by the manufacturers are sized or coated in order to improve handling and provide a tie coat to improve adhesion between the reinforcing fiber and the resin matrix. Despite the coating, it is difficult in injection molding or extrusion applications to compound the fibers with the resin without breaking the fibers to such an extent that their reinforcement capability is severely diminished.

SUMMARY OF THE INVENTION

The present invention provides a method and apparatus for incorporating reinforcement fibers into thermoplastic resin compositions for injection molding, extrusion or the like with a significant reduction in fiber breakage. The method comprises blending a low viscosity polymer solution and chopped fibers, preferably under low to moderate shear mixing conditions; blending the resulting dispersion with a molding polymer to be reinforced and removing the solvent.

The combination of the low viscosity polymer solution and the low to moderate shear mixing enables the fiber elements to be more easily dispersed throughout the polymer solution while at the same time significantly reducing fiber breakage. In the resulting fiber-polymer dispersion, the fibers are substantially completely coated by the polymer solution, causing them to blend more easily—without breaking—with the additional polymer to be reinforced.

BRIEF DESCRIPTION OF THE DRAWINGS

FIG. 1 is a representation of an embodiment of the method and apparatus of the invention.

DESCRIPTION OF THE PREFERRED EMBODIMENTS

The process of the present invention for the preparation of a reinforced plastic product comprises the steps of blending a low viscosity polymer solution and comminuted reinforcing fibers under low shear mixing conditions to form a dispersion of reinforcing fibers and polymer solution; blending said dispersion and molten polymer to be reinforced; and processing the resultant blend while simultaneously removing solvent therefrom, whereby a reinforced plastic product is recovered It is a particular feature of the invention that substantially any thermoplastic material can be reinforced by following the concept of the present invention.

Substantially any of the reinforcing fibers which are known in the art for reinforcing thermoplastic resin compositions can be employed in the practice of the invention. Exemplary of such reinforcing fibers are glass, carbon, graphite, ceramic and aramid fibrous materials. The invention works well with fibers of low-alkali aluminumborosilicate glass having a maximum alkali metal oxide content of 0.8% by weight known in the trade as E-glass. The fibers are comminuted or chopped into pieces ranging from ¼ inch to 3 inches in length. Typically, the chopped fibers will have substantially the same length, with the length in any particular case being dependent upon the size and configuration of the reinforced plastic product.

In forming the low viscosity polymer solutions which are used in the present invention, substantially any plastic material which can be solubilized in an organic solvent system can be used. Currently, thermoplastic polymers are preferred. Because the low viscosity polymer solutions of the invention are to be combined with reinforcing fibers to form an intermediate composition which is to be subsequently employed for reinforcing plastic resinous compositions, the thermoplastic polymer for the low viscosity polymer solutions is preferably compatible with the plastic polymeric material which is to be reinforced and is most preferably the same resin as that which is to be reinforced.

The thermoplastic resin used to form the low viscosity polymer solutions preferably has a molecular weight at least equal to the molecular weight of the resin which is to be reinforced, and most preferably, its molecular weight will be higher than the molecular weight of the resin composition to be reinforced. Currently, thermoplastic resins having molecular weights in the range from 100,000 to 1,000,000 are preferred. A partial list of thermoplastic polymeric materials which are useful in forming low viscosity solutions of the invention include, without limitation thereto, polypropylene, polyethylene, polyamides, polyamines, polycarbonate, polystyrene, styrene-acrylonitrile copolymers, acrylonitrile-butadiene-styrene terpolymers, polysulfones, polyesters, polyurethanes, polyphenylene sulfides, polyphenylene ethers and various thermoplastic rubbers.

Exemplary of currently preferred systems are the use of polyphenylene ethers or polystyrene in forming the low viscosity polymeric solutions for use with a molding grade polystyrene. Polystyrene can also be used to form the low viscosity polymer solutions for use with polyphenylene ether molding resins. Similarly, styrene-maleic anhydride copolymers and styrene-acrylonitrile copolymers can be used as molding resins with polystyrene or polyphenylene ether low viscosity polymer solutions or these copolymers can be employed in forming low viscosity polymer solutions for use with either polystyrene, polyphenylene ether or polystyrene-polyphenylene ether blend molding resins. Where polymer incompatibility is a problem, it is preferred to use the same resins, such as polycarbonate polymer solutions with polycarbonate molding resins.

Substantially any inert organic solvent can be employed in forming the low viscosity polymeric solutions which can dissolve the thermoplastic polymer component of the solutions. The viscosity of the polymer solutions must be sufficiently low to enable the polymer solution to be blended with the reinforcing fiber component under low shear conditions and to permit the individual fiber pieces to become evenly dispersed throughout the solution of polymer. In addition, the solvent must be sufficiently volatile that it can be readily removed by vaporization during the final fabrication step. Currently, aromatic or ketone type or halogenated solvents such as methylene chloride are preferred since they more readily solvate high molecular weight polymeric material.

Substantially any thermoplastic resin which can be melt processed can be reinforced in accordance with this invention, with resins having molecular weights in the range from about 100,000 to about 350,000 being most preferred. Among such thermoplastic polymeric materials are ABS and related multi-polymers, acrylic and alkylacrylic, amino resins, cellulosic, fluoroplastics, nylons, polyphenylene ethers, polyarylsulfone, polyurethanes, polycarbonates, polyesters, including alkyd polyesters, polyolefins, polyphenylene sulfides, polystyrene and related homopolymers and copolymers, polyvinylchloride, thermoplastic elastomers and vinylidene chloride polymers and copolymers. Particular resinous compositions to be reinforced in accordance with this invention are polycarbonates, polyphenylene ethers and polymers of styrene including copolymers of styrene and at least one monomer copolymerizable with styrene.

Referring to FIG. 1, blend tank 100, in which polymer granules and solvent are combined to form a low viscosity polymer solution, includes a solvent fill line 1 and a hopper 2 for feeding granulated polymer into tank 100. Tank 100 also includes a means, such as a gear pump, for transferring the low viscosity polymer solution formed therein from tank 100 through transfer line 3 to low shear mixer 200. Tank 100 is optionally and preferably equipped with external heat means, such as a heat exchanger, and a mixing means, such as a mechanical stirrer, neither of which are shown. Low shear mixer 200 includes a hopper 4 for feeding comminuted reinforcing fiber and low shear mixing means 5, such as twin "sigma" mixer blades, which can be driven by an external power means, such as an electric motor, which is not shown. Mixer 200 also includes an auger 6 for transferring the polymer solution-fiber dispersion which is formed in mixer 200 from mixer 200 through transfer line 7 to extruder-devolatilizer 300. Optionally, mixer 200 can include an external heat means, such as a heat exchanger, for temperature control.

Extruder-devolatilizer 300 includes a hopper 8 located at the rear of the extruder through which polymer to be reinforced, typically in granulated form, is fed to the extruder. Extruder 300 also includes auger 9 for moving polymer feedstock from hopper 4 forward through the extruder towards the die end 12. The polymer feedstock is plastified by frictional heat or a combination of frictional heat and externally supplied heat, such as from electric heaters or heat exchangers, not shown. Extruder 300 also has entry port 10 through which the polymer solution-fiber dispersion from mixer 200 is comingled with plastified polymer in extruder 300. Entry port 10 is located in close proximity to devolatilizer 11. The extruder-devolatilizer 300 may contain one or more interconnected sections, at least one being under vacuum, to facilitate removal of solvent from the system.

In practice, blend tank 100 is charged with an inert organic solvent, such as methylene chloride or methyl ethyl ketone, which is preferably at a temperature slightly below the boiling point of the solvent when introduced into tank 100. Tank 100 is typically operated at atmospheric pressure. A thermoplastic polymer, such as a polyphenylene ether or a molding grade polystyrene, is introduced into tank 100 after it has been filled to the desired level with solvent. The volumetric amount of solvent to thermoplastic resin is not fixed and may be adjusted and optimized for the particular resin-solvent system to provide a polymer solution having a total resin solids content in the range from 20 to 90 percent, most preferably in the range from 40 to 85 percent, and a viscosity not greater than 50,000 centipoises, preferably not greater than 4,000 centipoises.

Alternatively, the polymer solution could be made in a first low shear mixer identical to mixer 200 in which the dispersion is made and pumped to dispersion-forming mixer 200, or it can be made in low shear mixer 200 in which the dispersion is made with the fibers being added subsequent to forming the polymer solution. Alternately, the polymer solution could come from a polymerization reactor and could contain unreacted monomer as solvent.

The polymer solution is transferred by an appropriate means, such as a gear pump, through transfer line 3 to low shear mixer 200, where particulate reinforcing fibers are introduced through hopper 4 and mixed into and evenly dispersed throughout the polymer solution. The reinforcing fibers typically are in the range from one-quarter inch to three inches in length and typically are substantially the same length, although this is not critical. The dispersing of the fibers throughout the polymer solution is carried out in a mixing apparatus at low to moderate shear in the range from about 5 to 300 revolutions per minute, preferably 5 to 60 revolutions per minute, at temperatures below the boiling point of the solvent. The volumetric amount of fibers relative to the volume of the polymer solution is not fixed and ma be adjusted and optimized for the particular polymer solution to provide a fiber:polymer solution dispersion having not more than 60 percent, preferably not more than 40 volume percent, of reinforcing fiber. The amount of resin in the resin-solvent-fiber dispersion should be sufficient to coat each of the fibrous pieces and maintain a dispersion of fibers as a noncontinuous phase in the continuous resin-solvent phase. This balance is provided by the viscosity of the polymer solution which is introduced by the polymer:solvent ratio. Too high a polymer solids content of the solution increases the shear required for dispersing fibers and can lead to undesirable breakage of fibers. If the polymer solids content is too low, there can be undesirably large amounts of solvent which must be eventually removed, as well as difficulty in keeping the fibers not only uniformly dispersed but also in suspension and can result in insufficient resin being present to properly coat each discrete fiber piece.

From low shear mixer 200, the polymer-solvent-fiber dispersion is transferred by an appropriate means, such as a low shear screw extruder, to an extruder-devolatilizer 300 which is operated at elevated temperatures and has at least one zone which is maintained under vacuum at an absolute pressure of 5 millimeters to 200 millimeters of mercury. The polymer-solvent-fiber dispersion is preferably introduced to the extruder-devolatilizer at an entry point located in close proximity to the vacuum zone, in order to facilitate removal of solvent from the system. In extruder-devolatilizer 300, the dispersion is mixed with polymer to be reinforced, such as polystyrene, polycarbonate, styrene-acrylonitrile or the like, which is added through hopper 8 and is in a heat-plastified state resulting from frictional heat alone or in combination with external heat from electric heaters, heat exchanger or the like. The amount of dispersion blended with the polymer granules to be reinforced is such as to provide an amount of reinforcing fiber of approximately 35 percent by weight or less, preferably in the range from 5 to 25 percent by weight and most preferably in the range from 15 to 25 percent by weight, based on total weight of total resin and fiber. During the processing of the comingled streams of polymer granules from hopper 8 and polymer-solvent-fiber dispersion from mixer 200 in extruder-devolatilizer 300, the solvent is volatilized, recovered and recycled to a solvent treatment zone where it is purified and returned to storage, to blend tank 100 or otherwise disposed of. Alternatively, the recovered solvent stream can be directly recycled without any additional treatment to blend tank 100, stored or otherwise disposed of.

The devolatilized reinforced polymer solution following its devolatilization can be directly processed in an appropriate mold to produce shaped reinforced objects, such as automotive parts, building components, furniture components, tubs, bottles and various kinds of molded articles. Alternatively, the devolatilized reinforced resin composition can be extruded in raw form and pelletized for use in subsequent fabrication processes.

The following examples are set forth for purposes of illustration only and are not to be construed as limitations on the instant invention except as set forth in the appended claims. All parts and percentages are by weight unless otherwise indicated.

EXAMPLE 1

CONTROL

PREPARATION OF MOLDING COMPOSITIONS BY THE DIRECT INCORPORATION OF CHOPPED FIBERGLASS INTO MOLTEN UNREINFORCED RESIN

Granulated injection molding grade general purpose polystyrene is introduced into extruder-devolatilizer 300 through hopper 8. Chopped fiberglass is introduced into extruder 300 through entry port 10 and comingled with the heat-plastified unreinforced polystyrene. The amount of fiberglass fed into the system is regulated to provide a reinforced polystyrene having a fiberglass content of 20 weight percent. The reinforced polystyrene is molded into test pieces and the toughness measured.

Similar test pieces are prepared from molding grade styrene-acrylonitrile and styrene-maleic anhydride resins following the same procedure.

EXAMPLE 2

INVENTION

PREPARATION OF REINFORCED POLYMERIC COMPOSITIONS BY INCORPORATING INTO UNREINFORCED POLYMERS A DISPERSION OF FIBERGLASS IN A LOW VISCOSITY POLYMER SOLUTION

Methyl ethyl ketone is introduced into blend tank 100 and subsequently combined with the same polystyrene as employed in Example 1 to provide a polymer solution having a resin content of 30 weight percent. The polymer solution is pumped to mixer 200. An amount of fiberglass is added to mixer 200 through hopper 4 and dispersed through the polymer solution to provide a dispersion of fiberglass in polymer solution. The dispersion is pumped through line 7 to extruder-devolatilizer 300 through entry port 10 located adjacent devolatilizer 11. The dispersion is comingled with heat-plastified polystyrene (same as used in forming the polymer solution) which is introduced into extruder 300 through hopper 8. The solvent in the comingled system is flashed off in devolatilizer 11. The comingled streams comprise 80 weight percent polystyrene and 20 weight percent fiberglass, after solvent removal, and are molded into test pieces identical to those formed in Example 1 and tested. Similar test pieces are prepared from molding grade styrene-acrylonitrile and styrene-maleic anhydride polymers following the same procedure, with the polymer employed in forming the low viscosity polymer solutions being the same as the polymer which is to be reinforced.

COMPARATIVE TESTING

All test pieces which are molded following the procedure detailed in Examples 1 and 2 are subjected to the same test methods. Samples were tested for toughness by (1) hand bending and (2) holding the test pieces with a vice and striking with a hammer until they break.

In all cases, the test pieces prepared by the procedure of Example 2 are substantially tougher than the test pieces prepared according to the procedure of Example 1.

It is understood that the above is merely a preferred embodiment and that various changes and alterations can be made without departing from the spirit and broader aspects of the invention.

I claim:

1. A method for reducing fiber breakage in preparing fiber reinforced plastic extrudate comprising:
   blending a low viscosity polymer solution having a total resin solids content in the range from 20 to 90 percent and a viscosity not greater than 50,000 centipoises and chopped fibers under low to moderate shear mixing conditions at a mixing speed in the range from 5 to 300 revolutions per minute and a temperature below the boiling point of the solvent of said polymer solution to form a dispersion of chopped fibers in said polymer solution, the dispersion having not more than 60 volume percent of reinforcing fiber;
   blending said dispersion into a molten polymer to be reinforced; and
   extruding the resultant blend while simultaneously removing the solvent therefrom to form a reinforced fiber plastic extrudate.

2. A method in accordance with claim 1 wherein said polymer solution has a resin solids content in the range of 40 to 85 percent.

3. A method in accordance with claim 2 wherein said polymer solution has a viscosity which is not greater than 4,000 centipoises.

4. A method in accordance with claim 2 wherein the amount of reinforcing fiber is not greater than 40 volume percent.

5. A method in accordance with claim 2 wherein the amount of reinforcing fiber in said dispersion is sufficient to provide a reinforced polymer product containing not more than 35 percent by weight of reinforcing fiber.

6. A method in accordance with claim 5 wherein the amount of reinforcing fiber in said dispersion is sufficient to provide a reinforced polymer product containing from 5 to 25 percent by weight of reinforcing fiber.

7. A method in accordance with claim 2 wherein the amount of reinforcing fiber in said dispersion is sufficient to provide a reinforced polymer product containing not more than 35 percent by weight of reinforcing fiber.

8. A method in accordance with claim 7 wherein said low viscosity polymer solution comprises polystyrene and said molten polymer to be reinforced comprises polystyrene.

9. A method in accordance with claim 7 wherein said low viscosity polymer solution comprises styrene-acrylonitrile polymer and said molten polymer to be reinforced comprises styrene-acrylonitrile copolymer.

10. A method in accordance with claim 7 wherein said low viscosity polymer solution comprises styrene-maleic anhydride copolymer and said molten polymer to be reinforced comprises styrene-maleic anhydride copolymer.

11. A method in accordance with claim 1 wherein said solvent is removed in a vacuum devolatilization zone.

12. A method in accordance with claim 11 wherein said dispersion of chopped fibers in polymer solution is blended with said molten polymer to be reinforced at a point of entry near said vacuum devolatilization zone.

13. A method in accordance with claim 1 wherein the amount of reinforcing fiber is not greater than 40 volume percent.

14. A method in accordance with claim 1 wherein the amount of reinforcing fiber in said dispersion is sufficient to provide a reinforced polymer product containing not more than 35 percent by weight of reinforcing fiber.

15. A method in accordance with claim 14 wherein the amount of reinforcing fiber in said dispersion is sufficient to provide a reinforced polymer product containing from 5 to 25 percent by weight of reinforcing fiber.

16. A method in accordance with claim 14 wherein the amount of reinforcing fiber in said dispersion is sufficient to provide a reinforced polymer product containing from 15 to 25 percent by weight of reinforcing fiber.

* * * * *